(12) United States Patent
Terreri

(10) Patent No.: US 9,285,605 B2
(45) Date of Patent: Mar. 15, 2016

(54) EYEGLASS RETENTION DEVICE

(71) Applicant: Steven Terreri, Guilford, CT (US)

(72) Inventor: Steven Terreri, Guilford, CT (US)

(73) Assignee: Nobadeer Solutions, LLC, Guilford, CT (US)

( * ) Notice: Subject to any disclaimer, the term of this patent is extended or adjusted under 35 U.S.C. 154(b) by 0 days.

(21) Appl. No.: 14/267,979

(22) Filed: May 2, 2014

(65) Prior Publication Data

US 2015/0316785 A1 Nov. 5, 2015

(51) Int. Cl.
*G02C 5/14* (2006.01)
*G02C 3/00* (2006.01)

(52) U.S. Cl.
CPC ...................................... *G02C 3/003* (2013.01)

(58) Field of Classification Search
CPC .......... G02C 3/00; G02C 3/003; G02C 3/006; G02C 3/02
USPC .................................................. 351/155–157
See application file for complete search history.

(56) References Cited

U.S. PATENT DOCUMENTS

| 4,133,604 | A | | 1/1979 | Fuller | |
|---|---|---|---|---|---|
| 4,793,702 | A | * | 12/1988 | Ahrens et al. | .................. 351/157 |
| 4,820,036 | A | | 4/1989 | Seet | |
| 5,004,334 | A | | 4/1991 | Miele | |
| 5,384,605 | A | | 1/1995 | Escobosa | |
| 5,575,042 | A | | 11/1996 | Kalbach | |
| 6,520,635 | B1 | | 2/2003 | Ignatowski | |
| 6,899,423 | B1 | | 5/2005 | Brazell | |
| 7,467,867 | B1 | | 12/2008 | Williams | |
| 7,780,289 | B2 | * | 8/2010 | Pettingill | ....................... 351/156 |
| 7,896,492 | B2 | | 3/2011 | Pettingill | |
| 8,277,046 | B2 | | 10/2012 | Bond et al. | |
| 8,317,319 | B2 | | 11/2012 | Hellberg et al. | |
| 8,366,268 | B2 | | 2/2013 | Willaims | |
| 8,684,519 | B2 | | 4/2014 | Coleman | |
| D713,445 | S | | 9/2014 | Berning et al. | |

* cited by examiner

*Primary Examiner* — Scott J Sugarman
*Assistant Examiner* — Robert E Tallman
(74) *Attorney, Agent, or Firm* — Wiggin and Dana LLP; Gregory S. Rosenblatt; Jonathan D. Hall

(57) ABSTRACT

A retention device for two pairs of eyeglasses. A pair of retaining bands connect the opposite temples of each of the eyeglasses, so that when a user dons one of the pairs of eyeglasses, the other hangs against their person, thereby being protected, secured and readily available. In an alternate embodiment, a neckband is used from which retaining bands extend to secure two eyeglasses.

7 Claims, 7 Drawing Sheets

EYEGLASS RETENTION DEVICE

FIELD OF THE DISCLOSURE

The subject matter of the present disclosure generally relates to the retention of eyeglasses by a user, and more particularly relates to the retention of two pairs of eyeglasses around the neck of a user.

BACKGROUND OF THE DISCLOSURE

There are numerous devices for the retention of a single pair of glasses around the neck of a user. Typically, such devices include a single band or tube, each end of which is attached to a temple of a pair of eyeglasses. When the user does not wish to don the glasses, but nonetheless wishes them secure, safe, and readily available, the user removes the glasses and allows the glasses to hang, secured to their body by the placement of the band around the user's neck.

U.S. Pat. Nos. 7,467,867, 4,133,604, 4,820,036, 8,277,046, and 8,317,319 each disclose variations of this basic concept. U.S. Pat. No. 7,896,492 discloses a combination eyewear and accessory holder. The disclosures of U.S. Pat. Nos. 7,467,867, 4,133,604, 4,820,036, 8,277,046, 8,317,319 and 7,896,492 are incorporated by reference herein in their entirety.

However, problems persist for users that seek to simultaneously make use of multiple pairs of glasses, such as prescription eyeglasses and sunglasses. These users must select only one of the eyeglasses for immediate use and attempt to store the other pair. Often the unused pair must be placed in a pocket or other area where it may be subject to damage or breakage. In situations where no such storage space is available, for example when a user is in a swimsuit on a beach, the unused eyeglasses are particularly vulnerable. Furthermore, traditional eyeglass cases may be aesthetically unpleasing and prone to loss or theft.

The subject matter of the present disclosure is directed to overcoming, or at least reducing the effects of, one or more of the problems set forth above.

BRIEF SUMMARY OF THE DISCLOSURE

Disclosed is a dual eyeglass retention device that allows a user to secure two separate pairs of eyeglasses to their person. In a first embodiment, two bands connect the temples or other securement areas of the sides of two separate eyeglass pairs. For instance, the left temple of a first eyeglass pair is connected via a first band to the right temple of a second eyeglass pair, and the right temple of the first eyeglass pair is connected to the left temple of the second eye glass pair. The user is then able to don one of the pairs of the eyeglasses while the other pair is suspended against the user's back via the bands. Thus, transitioning between the pairs only requires the user to take off the first pair of eyeglasses and rotate the device around so that the second pair of eyeglasses can be donned.

The unused eyeglasses are kept safe and readily available. The unused pair of eyeglasses do not need to be held in the user's hands and no pocket or other storage space is necessary.

In a second embodiment, two retention bands extend from either side of a neck band, so that when the device is donned a user can wear one of the pairs of glasses while the other hangs against their chest.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Disclosed is a retention device for the securement of two pairs of eyeglasses.

Figure 1:
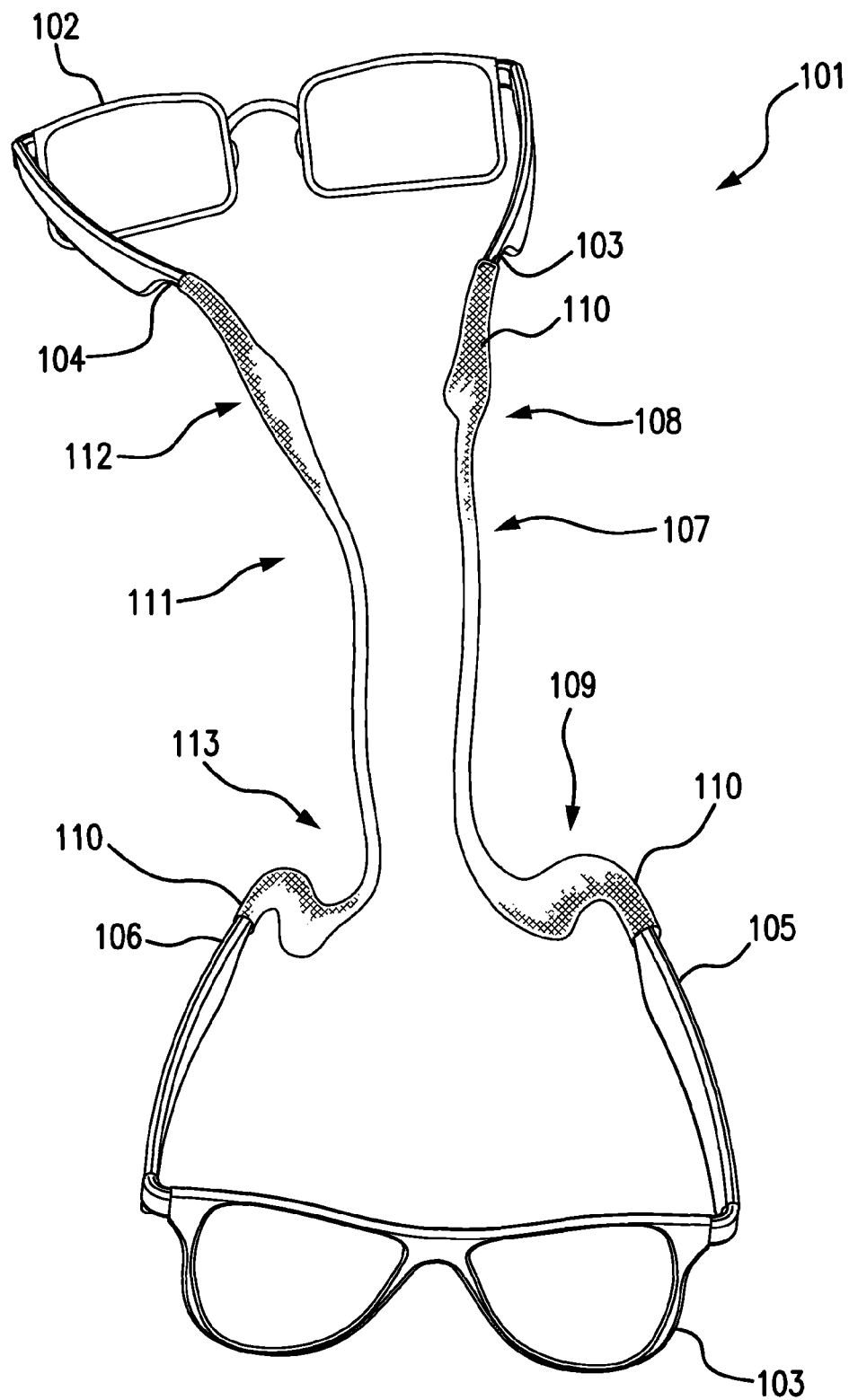
FIG. 1 is an illustration of a first embodiment.

FIG. 1 is an illustration of a first embodiment. Retention apparatus 101 is used to secure first pair of eyeglasses 102 and second pair of eyeglasses 103. First pair of eyeglasses 102 has first temple 103 and second temple 104. Similarly, second pair of eyeglasses has first temple 105 and second temple 106. First elongated band 107 has a first end 108 and second end 109, each of which have a retention device 110. Second elongated member 111 has a first end 112 and a second end 113, each of which has a retention device 110.

Figure 3:
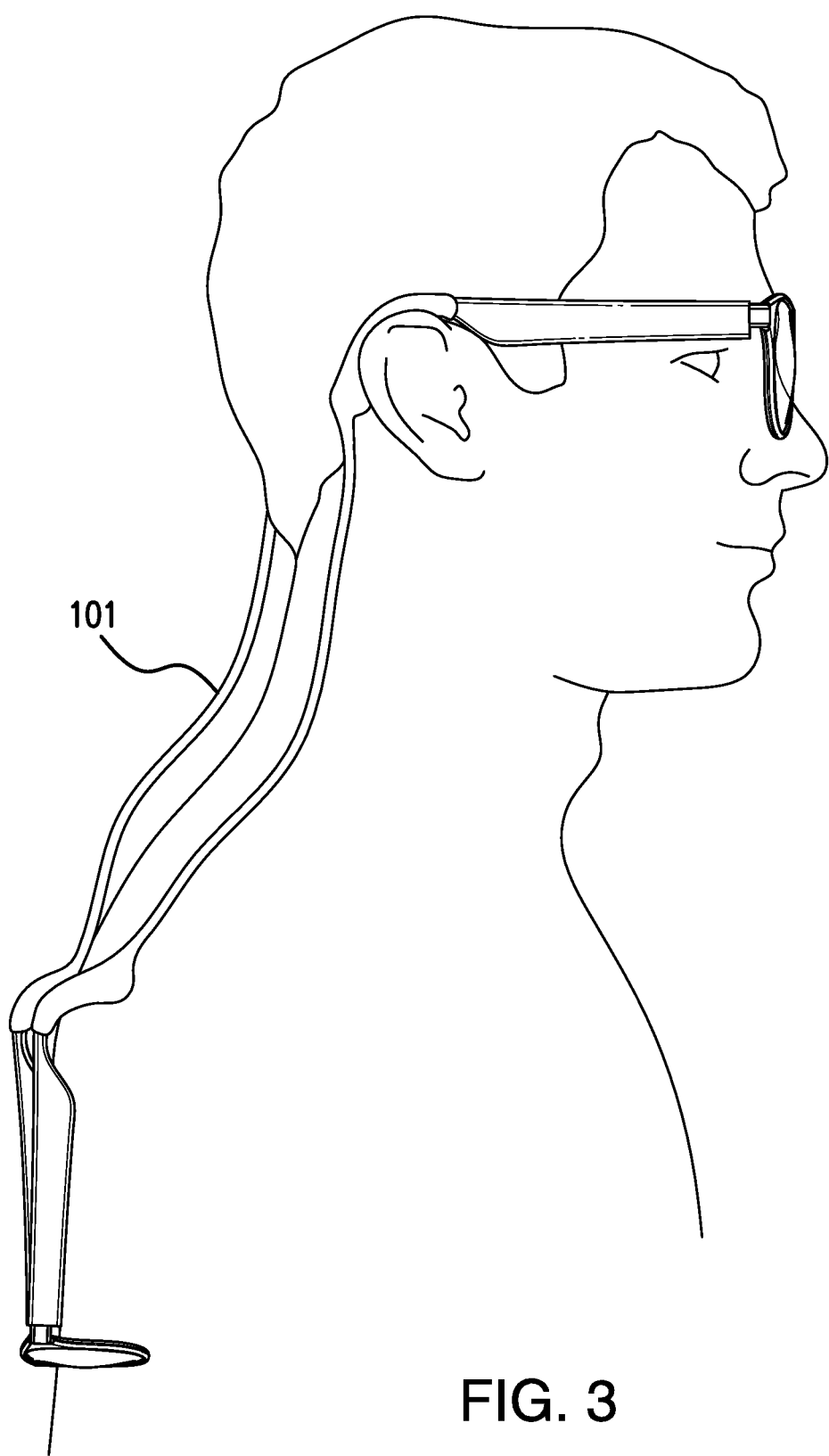
FIG. 3 is an illustration of the embodiment of FIG. 1 with one pair of eyeglasses donned by a user.

Retention devices 110 of first end 108 and first end 112 grasp first temple 103 and second temple 104 of eyeglasses 102, respectively. Similarly, retention devices 110 of second end 109 and second end 113 grasp first temple 105 and second temple 106 of eyeglasses 103. When a user dons eyeglasses 102, eyeglasses 103 are disposed against the back of the user. To switch to eyeglasses 103, the user simply removes eyeglasses 102 and rotates retention apparatus 101 in a 180° movement. FIG. 3 illustrates retention apparatus 101 as donned on a user.

The term eyeglasses should be understood to broadly include various optical devices, such as glasses and sunglasses, and other similar devices, such as the electronic augmentation system GOOGLE GLASS, manufactured by Google, Inc. of Mountain View, Calif.

Figure 2:
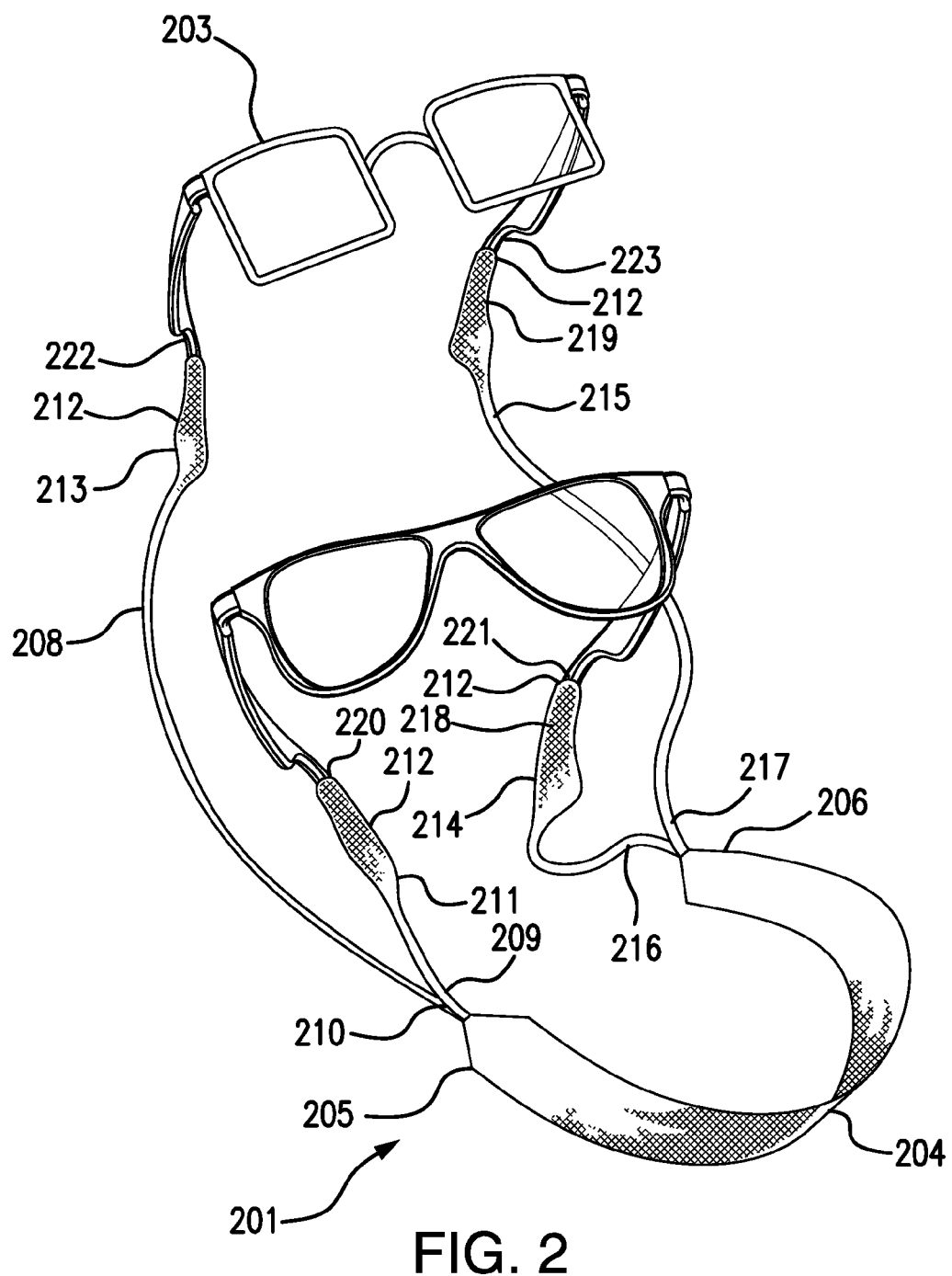
FIG. 2 is an illustration of a second embodiment.
Figure 4:
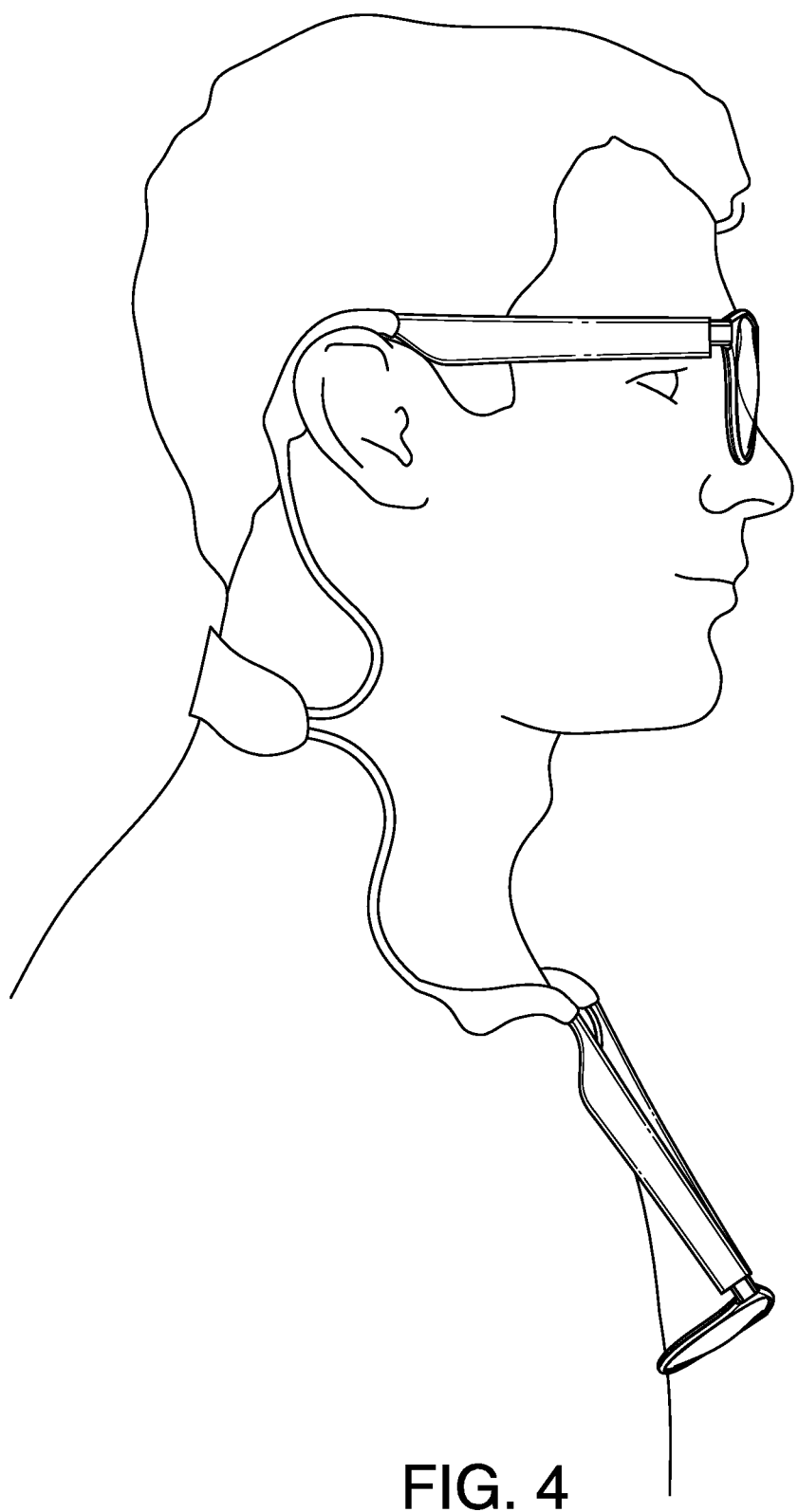
FIG. 4 is an illustration of the embodiment of FIG. 2 with one pair of eyeglasses donned by a user.

FIG. 2 is an illustration of a second embodiment. Retention apparatus 201 is used to secure first pair of eyeglasses 202 and second pair of eyeglasses 203. Neckband 204 has first end 205 and second end 206. First retaining band 207 and second retaining band 208 are connected at first end 209 and first end 210, respectively, to neckband first end 205. First retaining band 207 has disposed at second end 211 retention device 212. Similarly, second retaining band 208 has disposed at second end 213 retention device 212. Third retaining band 214 and fourth retaining band 215 are connected at first end 216 and first end 217, respectively, to neckband second end 206. Third retaining band 214 has disposed at second end 218 retention device 212. Similarly, fourth retaining band 215 has disposed at second end 219 retention device 212. Retention devices 212 at second end 211 and second end 218 are configured to grasp first temple 220 and second temple 221 of eyeglasses 202. Similarly, retention devices 212 at second end 213 and second end 219 are configured to grasp first temple 222 and second temple 223 of eyeglasses 203. FIG. 4 illustrates retention apparatus 201 as donned on a user.

It will be understood by those of skill in the art to which the present disclosure pertains that neckbands may be made from various suitable materials, such as leather, various fabrics and the like, and may be divided into various sections. For instance, a main portion may be made by a material that will be particularly comfortable when disposed on a user's neck, such as a soft pad, while outer ends of the neckband may be made from a polymer material that secures the retention bands to the neckband. Neckbands can also optionally be constructed from a material that is suitable for securement against a neck of a user, such as various rubbers.

Similarly, various materials are suitable for use in retaining bands and elongated members, such as cordage, various flexible plastics and polymers, coated or uncoated wire, etc.

Figure 5A:
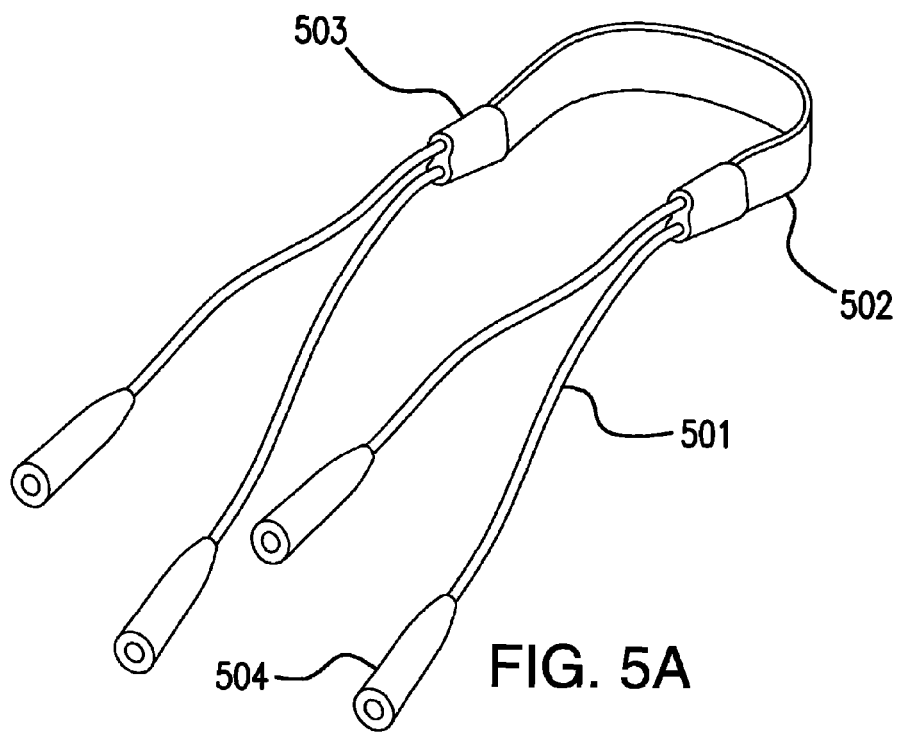
FIG. 5A is a perspective view illustration of an alternate embodiment.
Figure 5B:
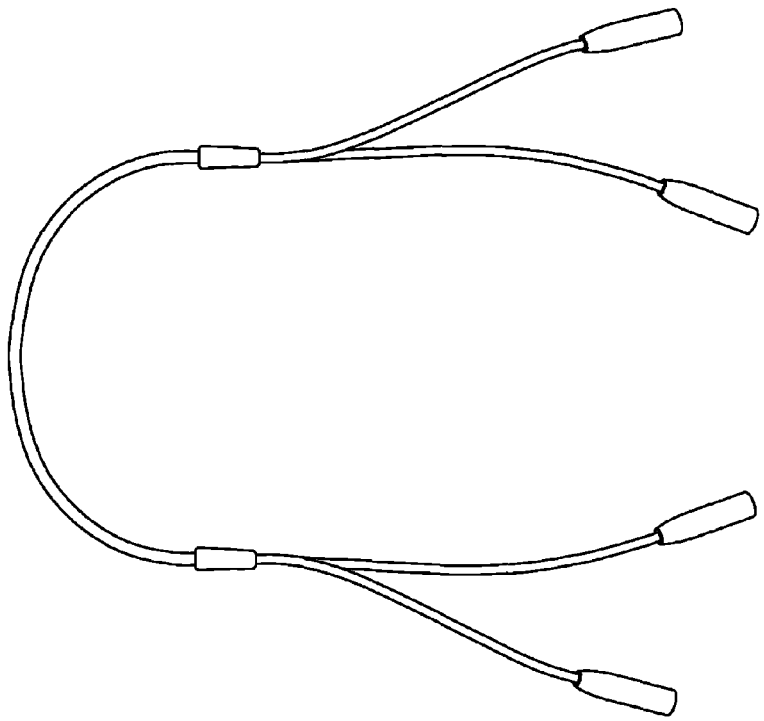
FIG. 5B is a top view illustration of the alternate embodiment of FIG. 5A.

FIGS. 5A-B illustrate an alternate embodiment. Retaining bands 501 are connected to neckband 502 at attachment sleeves 503. Retention devices 504 are attached to the ends of retaining bands 501.

Figure 6:
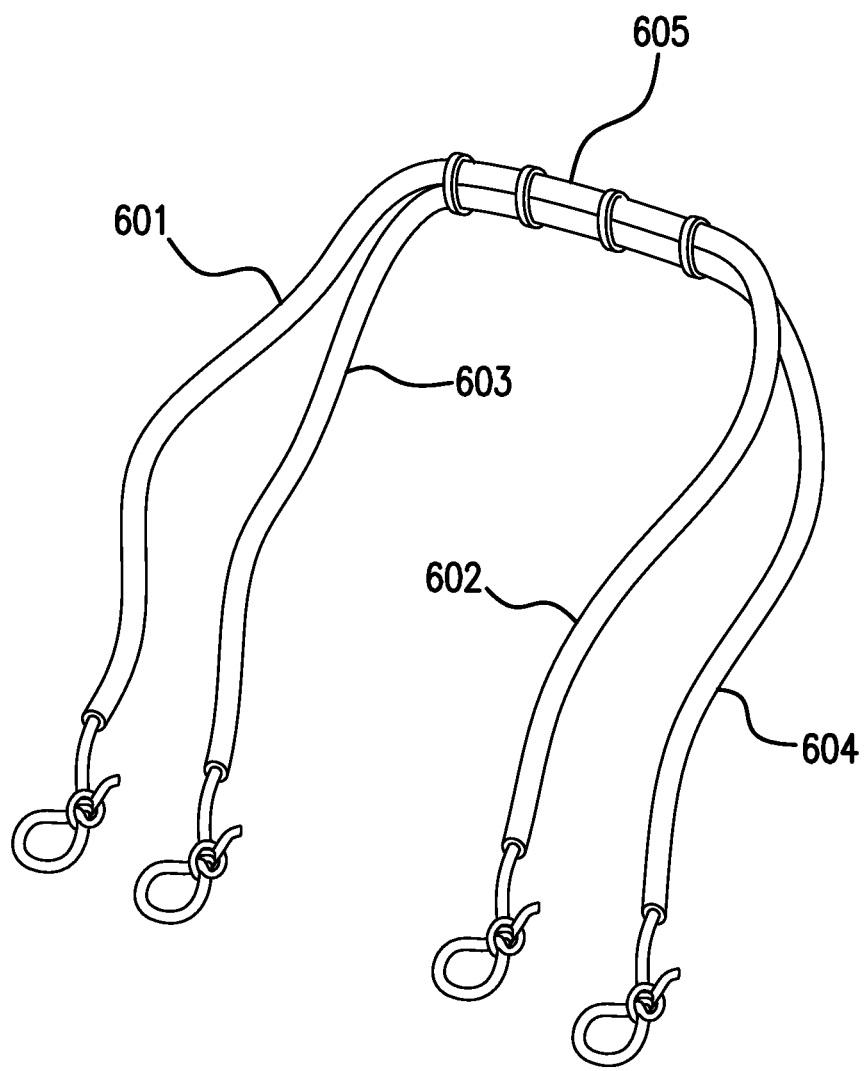
FIG. 6 is a perspective view illustration of a second alternate embodiment.

FIGS. 6 illustrates an alternate embodiment in which retaining bands 601 and 602 are formed from one strand of material and 603 and 604 are formed from another strand of material, the strands of material being bound together at neckband 605.

Figure 7A:
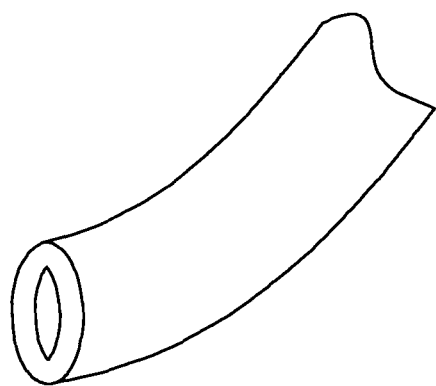
FIG. 7A is a perspective view of a first retaining device and elongated band section.
Figure 7B:
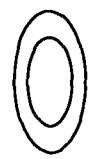
FIG. 7B is a cross section view of the retaining device of FIG. 7A.
Figure 7C:
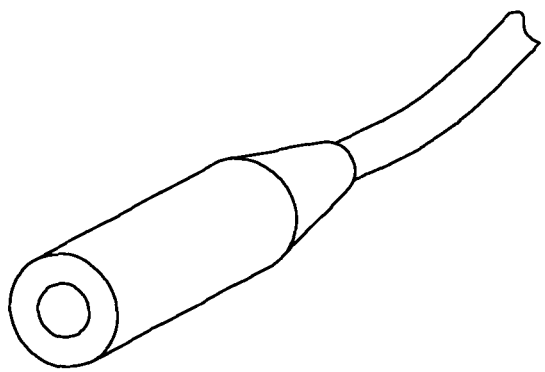
FIG. 7C is a perspective view of a second retaining device and elongated band section.
Figure 7D:
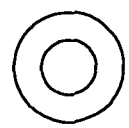
FIG. 7D is a cross section view of the retaining device of FIG. 7C.
Figure 7E:
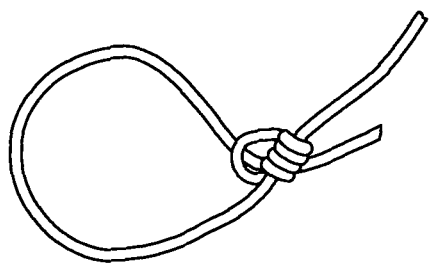
FIG. 7E is a perspective view of a third retaining device and elongated band section.
Figure 7F:
FIG. 7F is a cross section view of retaining device of FIG. 7E.

Retention devices for use in grasping the temples of eyeglasses may be any suitable retention device, such as grommets, crimps, rubber tubing, string ties, elastic material, etc. FIGS. 7A-F are illustrations of various types of retention devices for use with various embodiments. For instance, FIG. 7B illustrates a cross section of a continuous member depicted in perspective view in 7A. FIGS. 7C depicts a retention device that is larger than its accompanying retaining band, allowing a smaller retaining band to be used while still adequately securing a pair of eyeglasses. FIG. 7D depicts a cross section of the retaining device of FIG. 7C. FIGS. 7E shows a retention device that is a knotted closure (a solid cross section of which is depicted in FIG. 7F).

Retaining bands may be constructed from any suitable resilient material. Specifically, materials used in previous eyeglass retainers may be employed. Similarly, the lengths of the retaining bands and elongated members may vary depending on their particular use or other criteria.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention. For instance, various types of retaining devices, retention bands, and neckbands may be readily combinable to form alternate embodiments to those explicitly disclosed and depicted.

What is claimed:

1. An eyeglass retention apparatus, comprising:
  a first elongated band having a first retention device disposed at a first end thereof and a second retention device disposed at a second end thereof, wherein the first end and the second end of the first elongated band are traversed by a first connecting portion;
  a second elongated band having a third retention device disposed at first end thereof and a fourth retention device disposed at a second end thereof, wherein the first end and the second end of the second elongated band are traversed by a second connecting portion;
  wherein the first retention device and the third retention device are configured to grasp a first and a second temple of a first pair of eyeglasses, respectively;
  wherein the second retention device and the fourth retention device are configured to grasp a first and second temple of a second pair of eyeglasses;
  wherein the first connecting portion and the second connection portion are separate from one another over their entire lengths; and
  wherein the first elongated band and the second elongated band are flexible, whereby when the eyeglass retention apparatus is donned by a user and the first pair of eyeglasses is over the eyes of the user, the second pair of eyeglasses contacts the user's back.

2. The eyeglass retention apparatus of claim 1 wherein the type of the first, second, third and fourth retention devices is selected from the group consisting of grommets, crimps, rubber tubing, and string ties.

3. An eyeglass retention apparatus, comprising:
  a neckband including a body having a first and a second end, wherein the body has a length and a height substantially larger than a width;
  the neckband having attached at the first end a first attachment sleeve and attached at the second end a second attachment sleeve;
  a first retaining band terminating at a first end at the first attachment sleeve and connected at a second end to a first retention device;
  a second retaining band terminating at a first end at the first attachment sleeve, separately from the first retaining band, and connected at a second end to a second retention device;
  a third retaining band terminating at a first end at the second attachment sleeve and connected at a second end to a third retention device;
  a fourth retaining band terminating at a first end at the second attachment sleeve, separately from the first retaining band, and connected at a second end to a fourth retention device;
  wherein the first retaining band, second retaining band, third retaining band and fourth retaining band each have a length that is at least twice the length of the length of the neckband;
  wherein the first and third retention devices are configured to grasp a first and second temple of a first pair of eyeglasses; and
  wherein the second and fourth retention devices are configured to grasp a first and second temple of a second pair of eyeglasses.

4. The retention apparatus of claim 3 wherein the type of the first, second, third, and fourth retention devices is selected from the group consisting of grommets, crimps, rubber tubing, and string ties.

5. The retention apparatus of claim 3 wherein the neckband is constructed from a material suitable for securement against a neck of a user.

6. The retention apparatus of claim 5, wherein the neckband is a padded element.

7. The retention apparatus of claim 3 wherein the first and third retaining bands are portions of a first single strand and the second and fourth retaining bands are portions of a second single strand and the neckband is a bound portion of the first and second single strands.

\* \* \* \* \*